United States Patent
Gozloo et al.

(10) Patent No.: US 7,322,743 B2
(45) Date of Patent: Jan. 29, 2008

(54) TEMPERATURE MEASUREMENT SYSTEM AND METHOD

(75) Inventors: Bahman Gozloo, Peoria, IL (US); Paul C. Gottshall, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 11/187,965

(22) Filed: Jul. 25, 2005

(65) Prior Publication Data

US 2007/0019707 A1    Jan. 25, 2007

(51) Int. Cl.
*G01K 7/00* (2006.01)

(52) U.S. Cl. .................. 374/170; 374/163; 702/130

(58) Field of Classification Search ............ 374/178, 374/170; 702/130
See application file for complete search history.

(56) References Cited

U.S. PATENT DOCUMENTS

| | | | | |
|---|---|---|---|---|
| 4,463,436 | A * | 7/1984 | Veneklase ............ | 700/299 |
| 4,755,958 | A * | 7/1988 | Mizuhara ............. | 702/133 |
| 5,600,271 | A * | 2/1997 | Erickson et al. ...... | 327/108 |
| 5,677,644 | A * | 10/1997 | Silverbrook et al. .. | 327/131 |
| 6,232,618 | B1 | 5/2001 | Wienand et al. | |
| 7,082,377 | B1 * | 7/2006 | Aslan et al. ......... | 702/130 |
| 7,149,645 | B2 * | 12/2006 | Mangrulkar et al. ... | 702/130 |
| 7,180,211 | B2 * | 2/2007 | Sinha et al. ......... | 307/651 |
| 7,231,312 | B2 * | 6/2007 | Tanizawa ............. | 702/130 |
| 2002/0177970 | A1 * | 11/2002 | Awtrey et al. ........ | 702/130 |
| 2003/0118079 | A1 * | 6/2003 | Marinet et al. ....... | 374/178 |
| 2003/0137267 | A1 * | 7/2003 | Blake ................. | 318/471 |
| 2006/0190210 | A1 * | 8/2006 | Mukherjee ............ | 702/130 |
| 2006/0203883 | A1 * | 9/2006 | Griffin ............... | 374/178 |

* cited by examiner

*Primary Examiner*—Diego Gutierrez
*Assistant Examiner*—Mirellys Jagan
(74) *Attorney, Agent, or Firm*—Finnegan, Henderson, Farabow, Garrett & Dunner

(57) ABSTRACT

A temperature measurement system is provided to measure temperatures using temperature sensors. The temperature measurement system may include a controller having a plurality of address lines, a sensor configured to provide a plurality of inputs, and a connector configured to accept the inputs from the sensor. The temperature measurement system may also include a first multiplexer coupled with at least one input from the sensor and including a plurality of selector lines, and a second multiplexer coupled with one or more other inputs from the sensor and including a plurality of selector lines. The selector lines of the second multiplexer may be respectively coupled to the address lines of the controller. The temperature measurement system may also include a selector logic device coupled between the selector lines of the first multiplexer and the address lines of the controller such that the at least one input coupled to the first multiplexer corresponds to a variable number of inputs from the one or more other inputs coupled to the second multiplexer.

16 Claims, 8 Drawing Sheets

TEMPERATURE MEASUREMENT SYSTEM AND METHOD

TECHNICAL FIELD

This disclosure relates generally to temperature measurement systems and, more particularly, to temperature sensor based temperature measurement systems.

BACKGROUND

Modern work machines often require a plurality of temperature sensors to monitor temperature of many different parts of work machines. For example, temperature sensors may be used to measure temperature in engine parts, transmission systems, power generating systems, heating, ventilation, and air conditioning (HVAC) systems, and/or in environments outside or inside work machines. Different types temperature sensors, such as thermocouple sensors, 2-wire and 3-wire resistance temperature detector (RTD) sensors, or 2-wire and 3-wire thermisters sensors, may often be used.

To process signals from different types of temperature sensors and control the different types of sensors, conventional control systems may need separate printed circuit (PC) boards to accommodate different types of temperature sensors. For example, U.S. Pat. No. 6,232,618 issued to Wienand et al. on May 15, 2001 ("the '618 patent") discloses a temperature measurement system. The temperature measurement system in the '618 patent uses a temperature-dependent measuring resister which is integrated to its measuring circuitry.

Therefore, these conventional types of control system may increase cost of temperature measurement systems by using separate PC boards and may also decrease the maintainability of the work machine. In certain situation, it may be impractical to have a large number of separate PC boards if the number of different types of temperature sensors is large.

Methods and systems consistent with certain features of the disclosed systems are directed to solving one or more of the problems set forth above.

SUMMARY OF THE INVENTION

One aspect of the present disclosure includes a temperature measurement system. The temperature measurement system may include a controller having a plurality of address lines, a sensor configured to provide a plurality of inputs, and a connector configured to accept the inputs from the sensor. The temperature measurement system may also include a first multiplexer coupled with at least one input from the sensor and including a plurality of selector lines, and a second multiplexer coupled with one or more other inputs from the sensor and including a plurality of selector lines. The selector lines of the second multiplexer may be respectively coupled to the address lines of the controller. The temperature measurement system may also include a selector logic device coupled between the selector lines of the first multiplexer and the address lines of the controller such that the at least one input coupled to the first multiplexer corresponds to a variable number of inputs from the one or more other inputs coupled to the second multiplexer.

Another aspect of the present disclosure includes another temperature measurement system. The temperature measurement system may include a connector configured to accept a plurality of temperature sensor channels, each having a first input and a second input. The temperature measurement system may also include a first multiplexer having a plurality of input lines respectively coupled to the first inputs of the plurality of temperature sensor channels and a second multiplexer having a plurality of input lines respectively coupled to the second inputs of the plurality of temperature sensor channels. The temperature measurement system may also include a controller having address lines coupled to selector lines of the first multiplexer and selector lines of the second multiplexer and a logic device. The logic device may be coupled between the selector lines of the first multiplexer and the address lines and configured to correlate a first input selected by the first multiplexer with a variable number of second inputs selected by the second multiplexer.

Another aspect of the present disclosure includes a method used by a controller for temperature measurement. The method may include selecting a first temperature sensor channel corresponding to a first input and a second input of a temperature sensor by setting a first value for a plurality of address lines. The method may also include obtaining a first voltage information between the first input and the second input and selecting a second temperature sensor channel corresponding to a third input of the temperature sensor by setting a second value for the plurality of address lines. The method may further include selectively combining the first channel and the second channel to obtain a second voltage information between the first input and the third input and determining a detection voltage of the temperature sensor based on the first voltage information and the second voltage information.

Another aspect of the present disclosure includes a work machine. The work machine may include an engine configured to provide power to the work machine and a plurality of sensors configured to measure temperature. The work machine may also include a temperature measurement system configured to accept the plurality of sensors for temperature measurement. The temperature measurement system may include a controller and a connector configured to accept inputs from a sensor. The temperature measurement system may also include a first multiplexer coupled with at least one input from the sensor and a second multiplexer coupled with one or more other inputs from the sensor, wherein selector lines of the second multiplexer are respectively coupled to address lines of the controller. The temperature measurement system may further include a selector logic device coupled between selector lines of the first multiplexer and the address lines of the controller such that the at least one input coupled to the first multiplexer corresponds to a variable number of inputs from the one or more other inputs coupled to the second multiplexer.

BRIEF DESCRIPTION OF THE DRAWINGS

The accompanying drawings, which are incorporated in and constitute a part of this specification, illustrate several embodiments and together with the description, serve to explain the principles of the disclosed embodiments. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
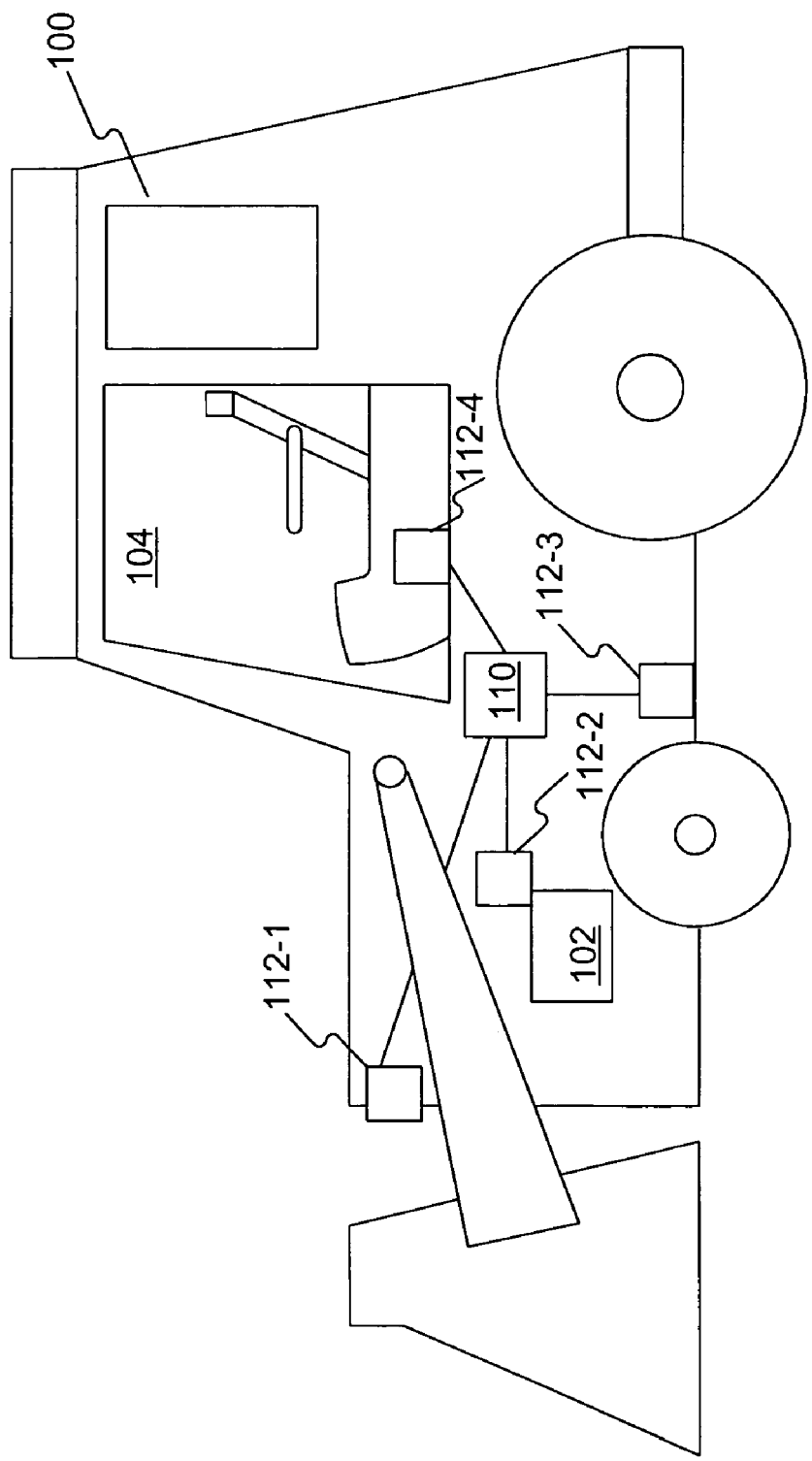
FIG. 1 is a pictorial illustration of an exemplary system that may incorporate certain disclosed embodiments.

FIG. 1 illustrates an exemplary work machine 100 in which features and principles consistent with certain disclosed embodiments may be incorporated. Work machine 100 may refer to any type of fixed or mobile machine that performs some type of operation associated with a particular industry, such as mining, construction, farming, transportation, etc. and operates between or within work environments (e.g., construction site, mine site, power plants and generators, on-highway applications, etc.). Work machine 100 may also include commercial vehicles, such as cars, vans, trucks, marine vessels, and/or aircrafts, etc. Although, as shown in FIG. 1, work machine 100 is an earth handling type work machine, any type of work machine may be used.

As shown in FIG. 1, work machine 100 may include an engine 102, a cabin 104, a temperature measurement system 110, and a plurality of temperature sensors 112-1 to 112-4. It is understood that the components listed are exemplary only. The number of the components may be changed, and other components may be added.

Engine 102 may be any appropriate type of engine that generates power for work machine 100. Cabin 104 may be provided for an operator or operators of work machine 100. Cabin 104 may also be equipped with certain types of instrumentation (not shown) for operation of work machine 100.

Temperature measurement system 110 may be used to measure temperatures of a variety of locations both inside and outside work machine. The plurality of temperature sensors 112-1 to 112-4 may be installed at the variety of locations to obtain temperature information. For example, temperature measurement system 110 may monitor outside temperature, radiator temperature, or coolant temperature via temperature sensor 112-1. Temperature measurement system 110 may also monitor various engine temperatures via temperature sensor 112-2. Temperature measurement system 110 may also monitor different temperatures of other work machine components (not shown), such as transmission, exhaust system, or electrical systems, via temperature sensor 112-3. Further, temperature measurement system 110 may also monitor cabin temperature via temperature sensor 112-4.

Temperature sensors 112-1 to 112-4 may include any appropriate types of temperature sensors. For example, temperature sensors 112-1 to 112-4 may include thermistors, resistance temperature detectors (RTDs), thermocouples, and/or other types of temperature sensors. When monitoring different temperatures of different locations or components, different types of temperature sensors and/or different numbers of temperature sensors may be used. Further, a particular type of temperature sensor may also have different configurations. For example, an RTD may use two wires or three wires. That is, the RTD may include two input wires or three input wires.

In certain embodiments, the configuration of a particular type of temperature sensor may be changed over time. For example, a 2-wire RTD may be replaced by a 3-wire RTD to increase precision requirements even in the field. When interfacing with different types of temperature sensors 112-1 to 112-4 and/or different configurations of temperature sensors 112-1 to 112-4, temperature measurement system 110 may include features configured to adaptively and dynamically perform temperature measurement.

Figure 2:
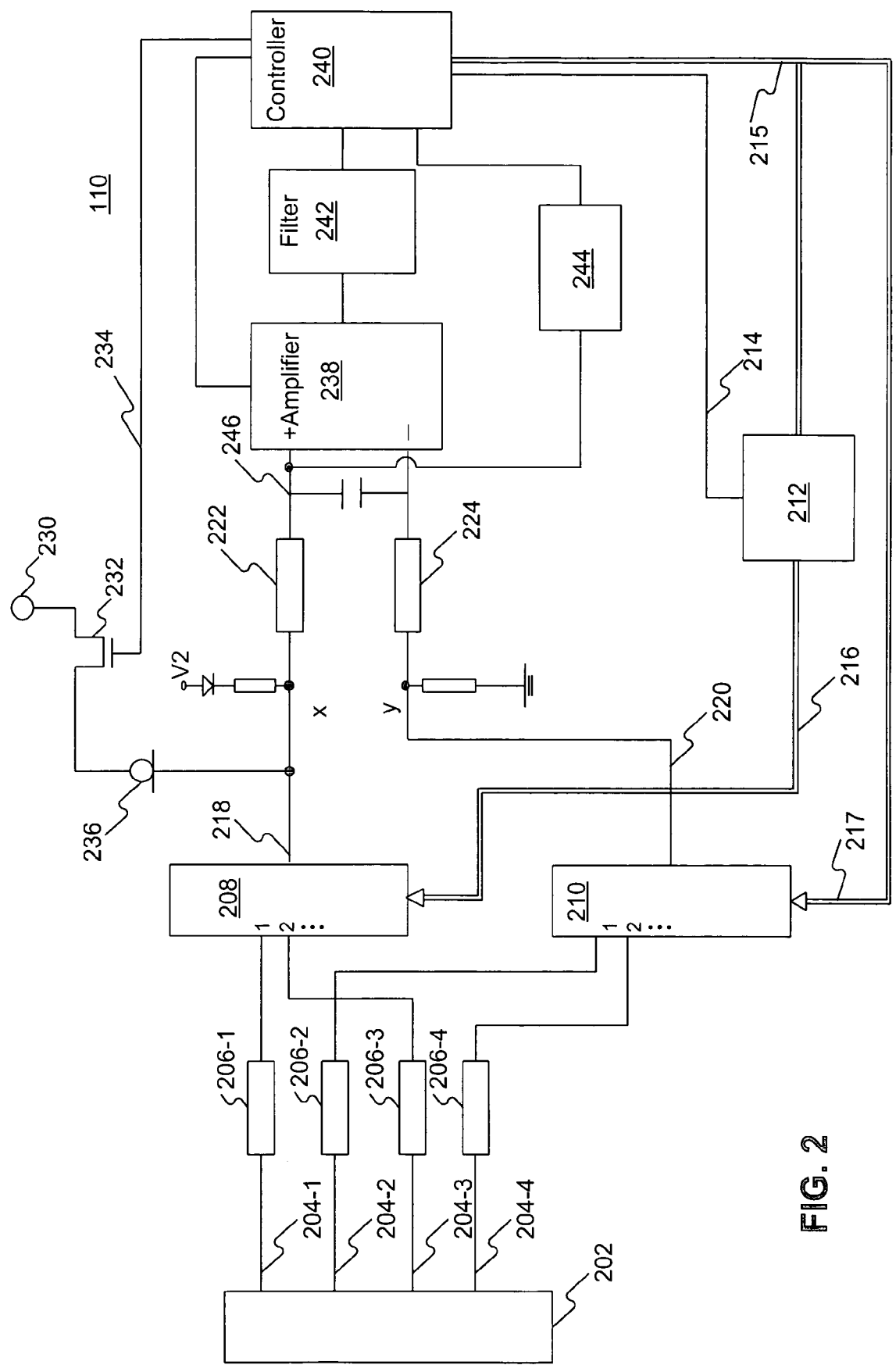
FIG. 2 illustrates a block diagram of a temperature measurement system consistent with certain disclosed embodiments.

FIG. 2 shows an exemplary block diagram of temperature measurement system 110. As shown in FIG. 2, temperature measurement system 110 may include a connector 202, input lines 204-1 to 204-4, resistors 206-1 to 206-4, a high side multiplexer 208, a low side multiplexer 210, and a selector logic 212. Temperature measurement system 110 may also include a control line 214, address lines 215, selector lines 216 and 217, resistors 222 and 224, a voltage 230, an electronic switch 232, a switch control signal 234, and a current source 236. Further, temperature measurement system 110 may include an amplifier 238, a controller 240, a filter 242, a diagnostic circuit 244, and a capacitor 246, which forms a low pass filter together with resistors 222 and 224. Those skilled in the art will recognize that the components listed in FIG. 2 are exemplary only. The number of the components may be changed, certain components may be removed, and certain other components may be added.

Connector 202 may include any appropriate type of connector with a plurality of I/O connector pins. The I/O connector pins of connector 202 may be coupled to input lines of a plurality of temperature sensors to carry signals from temperature sensors to temperature measurement system 110. The I/O connector pins may be grouped into a plurality of temperature sensor channels. For simplicity, a temperature sensor channel as shown in FIG. 2 may include two input lines. For example, input lines 204-1 and 204-2 may correspond to a first 2-wire temperature sensor (e.g., channel 1), and input lines 204-3 and 204-4 may correspond to a second 2-wire temperature sensor (e.g., channel 2).

The number of the plurality of I/O connector pins may then be determined based on the maximum number of temperature sensor channels that are supported by temperature measurement system 110. For example, a 32-channel connector may include 64 I/O connector pins. Other numbers of channel, however, may also be used. Further, connector 202 may also include certain temperature sensor compensation circuitry (e.g., cold junction compensation for thermocouples) for circuit compensation and calibration purposes.

On the other hand, the number of temperature sensors supported by temperature measurement system 110 may vary. In certain embodiments, The temperature sensor channels may be combined to support temperature sensors with different number of input wires. For example, a single channel may support a 2-wire temperature sensor, while two temperature sensor channels may be used together to support a 3-wire temperature sensor. In particular, input lines 204-1, 204-2, and 204-4 may correspond to a 3-wire temperature sensor.

Two input lines of a temperature sensor channel may be separately coupled to high side multiplexer 208 and low side multiplexer 210. For example, input lines 204-1 and 204-3 may be coupled to inputs 1 and 2 of high side multiplexer 208, respectively. And input lines 204-2 and 204-4 may be coupled to inputs 1 and 2 of low side multiplexer 210, respectively. High side multiplexer 208 and low side multiplexer 210 may be used together to select correlated inputs from a temperature sensor to be measured. That is, high side multiplexer 208 may select one of the two input lines of a temperature sensor channel, and low side multiplexer 210 may select the other input line of the same temperature sensor channel. Optionally, resistors 206-1 to 206-4 may be respectively coupled between input lines 204-1 to 204-4 and corresponding inputs of multiplexers 208 and 210. Resistors 206-1 to 206-4 may include any appropriate types of resistors. In certain embodiments, resistors 206-1 to 206-4 may refer to wiring and contact resistance of connection between connector 202 and multiplexers 208 and 210.

High-side multiplexer 208 and low side multiplexer 210 maybe any appropriate types of multiplexers. For example, high side multiplexer 208 and low side multiplexer 210 may be 16:1 multiplexers. High side multiplexer 208 may combine a plurality of input lines (e.g., respective one input line of each channel) into a single output line 218. Output line 218 may be further coupled to a positive input of amplifier 238 via a resistor 222. On the other hand, low side multiplexer 210 may combine the other input lines (e.g., the other input line of each channel) into a single output line 220. Output line 220 may be further coupled to a negative input of amplifier 238 via a resistor 224. Capacitor 246 may also be coupled between output line 218 and output line 220 to form a low pass filter together with resistors 222 and 224 to improve signal qualities.

High side multiplexer 208 and low side multiplexer 210 may include a single multiplexer chip or plural multiplexer chips to achieve desired multiplexing ratios. As explained above, to select a particular channel for temperature measurement, output line 218 and output line 220 may correspond to input lines of the particular channel. Such selection may be performed by configuring selector lines of both high side multiplexer 208 and low side multiplexer 210 concurrently under the control of controller 240. For example, selector lines 217 of low side multiplexer 210 may be coupled to address lines 215 of controller 240 to be configured by controller 240. Selector lines 216 of high side multiplexer 208 may be coupled to address lines 215 to be configured by controller 240.

Selector lines 215 and 217 may be configured to the same values if 2-wire temperature sensors are selected. That is, selector lines 216 and 217 may correspond to the same channel selected. However, if 3-wire temperature sensors are used, selector lines 216 may be configured differently from selector lines 217 via selector logic 212. That is, selector lines 216 and 217 may correspond to a combination of relevant channels.

Selector logic 212 may be coupled between selector lines 216 and address lines 215 to perform address translation and/or conversion such that selector lines 216 and 217 may be correlated. Selector logic 212 may be implemented via various means, such as programmable logic devices (e.g., field programmable gate arrays (FPGA)), and/or software programs. A separate control line 214 may also be provided between selector logic 212 and controller 240 to control operation of selector logic 212 on channel selections. The detailed operation of selector logic 212 is described in FIG. 4.

Further, output line 218 may be coupled to current source 236, which may be coupled to voltage 230 via electronic switch 232. Current source 236 may provide electric current to certain types of temperature sensors, such as RTDs. Electronic switch 232 may include any appropriate type of electronic switch (e.g., transistor switch). Electronic switch 232 may be used to turn on/off current source 236 depending on the type of temperature sensor in use. For example, current source 236 may be turned off when the temperature sensor in use is of a thermocouple type. Electronic switch 232 may be controlled by control signal 234 from controller 240. For example, if control signal 234 is set to '0', electronic switch 232 may be turned off. On the other hand, if control signal 234 is set to '1', electronic switch 232 may be turned on.

As explained, output lines 218 and 220 may be coupled to the positive input and the negative input of amplifier 238, respectively, to provide signals from temperature sensor channels for further processing. Amplifier 238 may include any appropriate type of operational amplifier. For example, amplifier 238 may be a programmable gain instrument amplifier. An output of amplifier 238 may be further conditioned and/or processed by filter 242. Filter 242 may include any appropriate type of filter. For example, filter 242 may include an active filter. Other types of filters, such as passive filters or switched capacitor filters, however, may also be used.

Optionally, signals on the positive input of amplifier 238 may also be provided to diagnostic circuit 244. Diagnostic circuit 244 may include any appropriate logic to perform control and diagnostics. For example, diagnostic circuit 244 may detect occurrences of open sensors, sensors short to system voltage, and/or sensors short to ground, etc.

Figure 3:
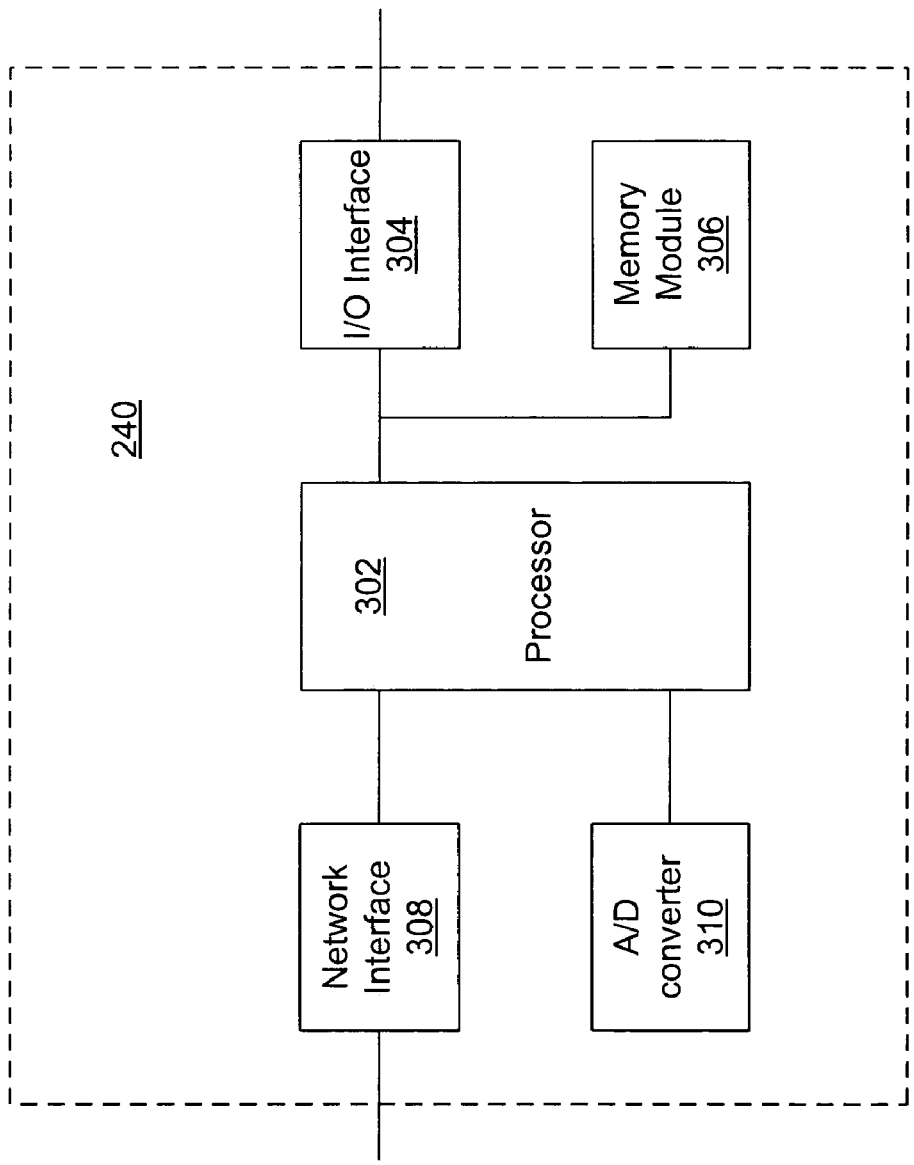
FIG. 3 illustrates a block diagram of an exemplary controller consistent with certain disclosed embodiments.

After being processed by amplifier 238 and filter 242, the signals from the temperature sensor channels may be provided to and processed by controller 240. Controller 240 may include any appropriate type of microprocessor based control system for providing control and processing functions. Controller 240 may be configured as a general processor module, a special processor (e.g., digital signal processor) module, and/or a microcontroller module. FIG. 3 shows an exemplary functional block diagram of controller 240 consistent with this disclosed embodiment.

As shown in FIG. 3, controller 240 may include a processor 302, an I/O interface 304, a memory module 306, a network interface 308, and an analog-to-digital (A/D) converter 310. Other components, however, may also be included in controller 240. As explained above, processor 302 may include one or more microprocessors or DSPs supported by various peripheral devices, such as memory and/or input and output devices, etc. Alternatively, processor 302 may include one or more microcontrollers with on-board memory and I/O ports.

I/O interface 304 may include one or more input/output interface devices. Processor 302 may exchange information with external devices, such as high side multiplexer 208, low side multiplexer 210, and selector logic 212. For example, I/O interface 304 may provide address lines 215 to select a particular temperature sensor channel. I/O interface 304 may also provide control signal 234 to control electronic switch 232, and control signals to other components, such as amplifier 238, and selector logic 212, etc.

Memory module 306 may include one or more memory devices including, but not limited to, a ROM, a flash memory, an electrically erasable programmable read-only memory (EEPROM), a dynamic RAM, and a static RAM. Memory module 306 may be configured to store information used by processor 302. Memory module 306 may also be used to store channel selection table used by selector logic 212.

Network interface 308 may include any appropriate network adaptor configured to exchange information with other controllers or components (not shown) of work machine 100. Particularly, processor 302 may use network interface 308 to transfer various temperature status information to relevant control systems on work machine 100 for further processing and/or for system-wide control and diagnostics.

Further, A/D converter 310 may include any appropriate type of analog-to-digital converter to convert amplified signals from temperature sensor channels into digital format for further processing by processor 302. Precision of A/D converter 310 may be determined by precision requirements for temperature measurement and/or processing power of processor 302, etc.

Figure 4:
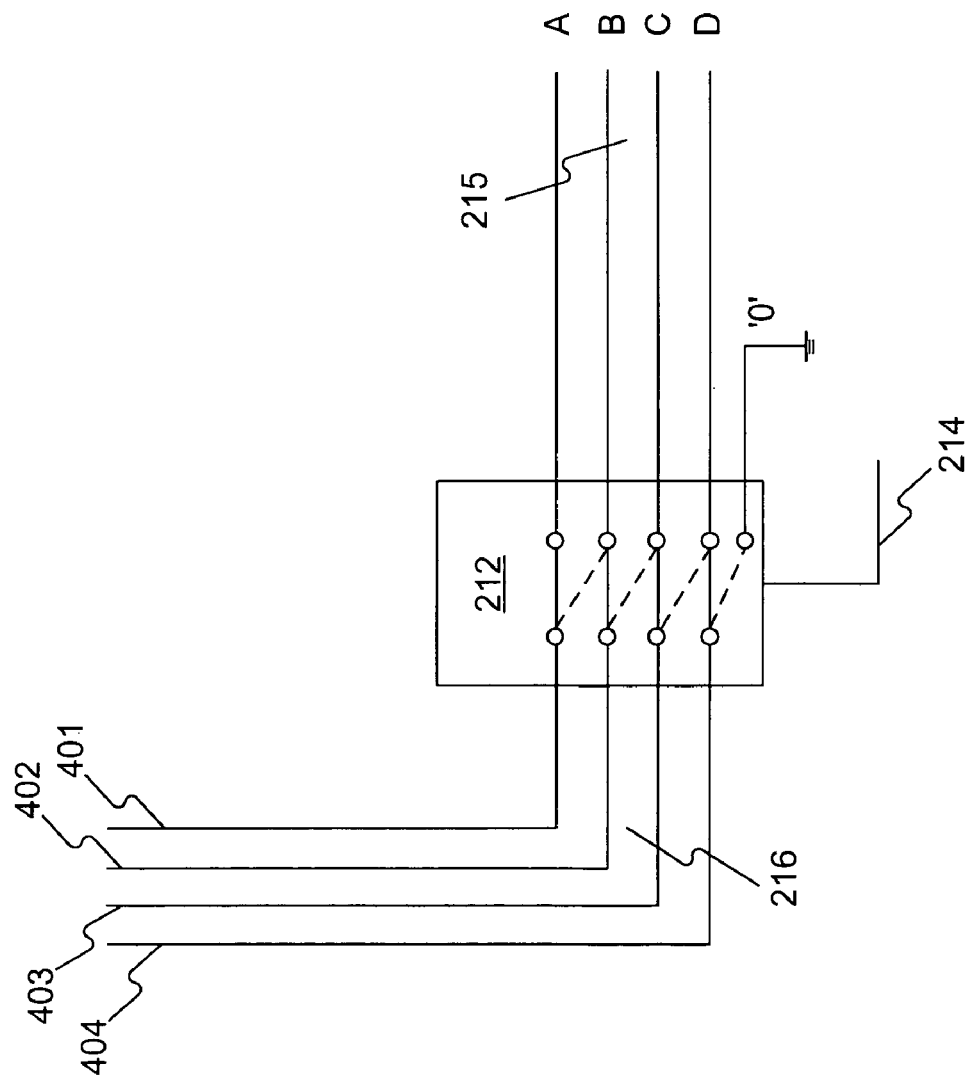
FIG. 4 illustrates an exemplary selector logic consistent with certain disclosed embodiments.

Processor 302 may use control line 214 to control operation of selector logic 212. FIG. 4 shows an exemplary selector logic 212 consistent with disclosed embodiments. As shown in FIG. 4, address lines 215 may include four separate lines 'A', 'B', 'C', 'D', corresponding to a 4-digit address (e.g., 'D' being the highest digit and 'A' being the lowest digit). Selector lines 216 may also include four separate lines 401-404, corresponding to a 4-digit select address (e.g., line 404 being the highest digit and line 401 being the lowest digit). Based on values of control line 214, different values may be assigned to select address lines 404, 403, 402, and 401 by selector logic 212. For example, if control line is set to '0', selector logic 212 may couple lines 404, 403, 402, and 401 to address lines 'D', 'C', 'B', 'A', respectively. On the other hand, if control line is set to '1', selector logic 212 may couple lines 404, 403, 402, and 401 to '0', 'D', 'C', 'B', respectively. Tables 1 and 2 show values of selector lines 404, 403, 402, and 401 and corresponding channel number when the value of control line 214 (i.e., CS) is '0' and '1', respectively.

TABLE 1

Select address lines and channel number when CS is '0'

| CS | D | C | B | A | Channel No. |
|---|---|---|---|---|---|
| 0 | 0 | 0 | 0 | 0 | CH1 |
| 0 | 0 | 0 | 0 | 1 | CH2 |
| 0 | 0 | 0 | 1 | 0 | CH3 |
| 0 | 0 | 0 | 1 | 1 | CH4 |
| 0 | 0 | 1 | 0 | 0 | CH5 |
| 0 | 0 | 1 | 0 | 1 | CH6 |
| 0 | 0 | 1 | 1 | 0 | CH7 |
| 0 | 0 | 1 | 1 | 1 | CH8 |
| 0 | 1 | 0 | 0 | 0 | CH9 |
| 0 | 1 | 0 | 0 | 1 | CH10 |
| 0 | 1 | 0 | 1 | 0 | CH11 |
| 0 | 1 | 0 | 1 | 1 | CH12 |
| 0 | 1 | 1 | 0 | 0 | CH13 |
| 0 | 1 | 1 | 0 | 1 | CH14 |
| 0 | 1 | 1 | 1 | 0 | CH15 |
| 0 | 1 | 1 | 1 | 1 | CH16 |

TABLE 2

Select address lines and channel number when CS is '1'

| CS | '0' | D | C | B | Channel No. |
|---|---|---|---|---|---|
| 1 | 0 | 0 | 0 | 0 | CH1 |
| 1 | 0 | 0 | 0 | 0 | CH1 |
| 1 | 0 | 0 | 0 | 1 | CH2 |
| 1 | 0 | 0 | 0 | 1 | CH2 |
| 1 | 0 | 0 | 1 | 0 | CH3 |
| 1 | 0 | 0 | 1 | 0 | CH3 |
| 1 | 0 | 0 | 1 | 1 | CH4 |
| 1 | 0 | 0 | 1 | 1 | CH4 |
| 1 | 0 | 1 | 0 | 0 | CH5 |
| 1 | 0 | 1 | 0 | 0 | CH5 |
| 1 | 0 | 1 | 0 | 1 | CH6 |
| 1 | 0 | 1 | 0 | 1 | CH6 |
| 1 | 0 | 1 | 1 | 0 | CH7 |
| 1 | 0 | 1 | 1 | 0 | CH7 |
| 1 | 0 | 1 | 1 | 1 | CH8 |
| 1 | 0 | 1 | 1 | 1 | CH8 |

As shown in Table 1, when control line 214 is '0', selector lines 216 of high side multiplexer 208 corresponds to address lines 215. When a 4-digit address is used, a total number of 16 channels may be supported. Further, selector lines 217 of low side multiplexer 210 also correspond to address lines 215. Table 1 thus shows channel selection of both high side multiplexer 208 and low side multiplexer 210. High side multiplexer 208 and low side multiplexer 210 may be addressed by the same address 'DCBA' to select the same channels. Such configuration may be used to support 2-wire temperature sensors.

On the other hand, when control line 214 is set to '1', as shown in Table 2, selector lines 216 may correspond to a selected part of address line digits 'DCBA'. For example, only 'DCB' digits may be used, while the highest digit is coupled to a '0'. When '0DCB' is coupled to selector lines 216 by selector logic 212, high side multiplexer 208 may only select eight channels (e.g., channels 1-8), as shown in Table 2. Meanwhile, because selector lines 217 of low side multiplexer 210 still correspond to address line digits 'DCBA', low side multiplexer 210 may select sixteen channels (e.g., channels 1-16). In this example, digit 'A' may change channel selection on low side multiplexer 210, but channel selection on high side multiplexer 208 may remain unchanged regardless of the value of digit 'A'. Thus, two channels selected by low side multiplexer 210 may correspond to one channel selected by high side multiplexer 208. Such a configuration may be used to support 3-wire temperature sensors.

Although digits '0DCB' are used in the example above, other configuration or mapping may also be used. For instance, instead of using '0DCB', 'DCB0' or other combinations may be used to select different channels by high side multiplexer 208 for 3-wire temperature sensors. In certain embodiment, such a configuration may be dynamically changed during system run time.

Figure 5:
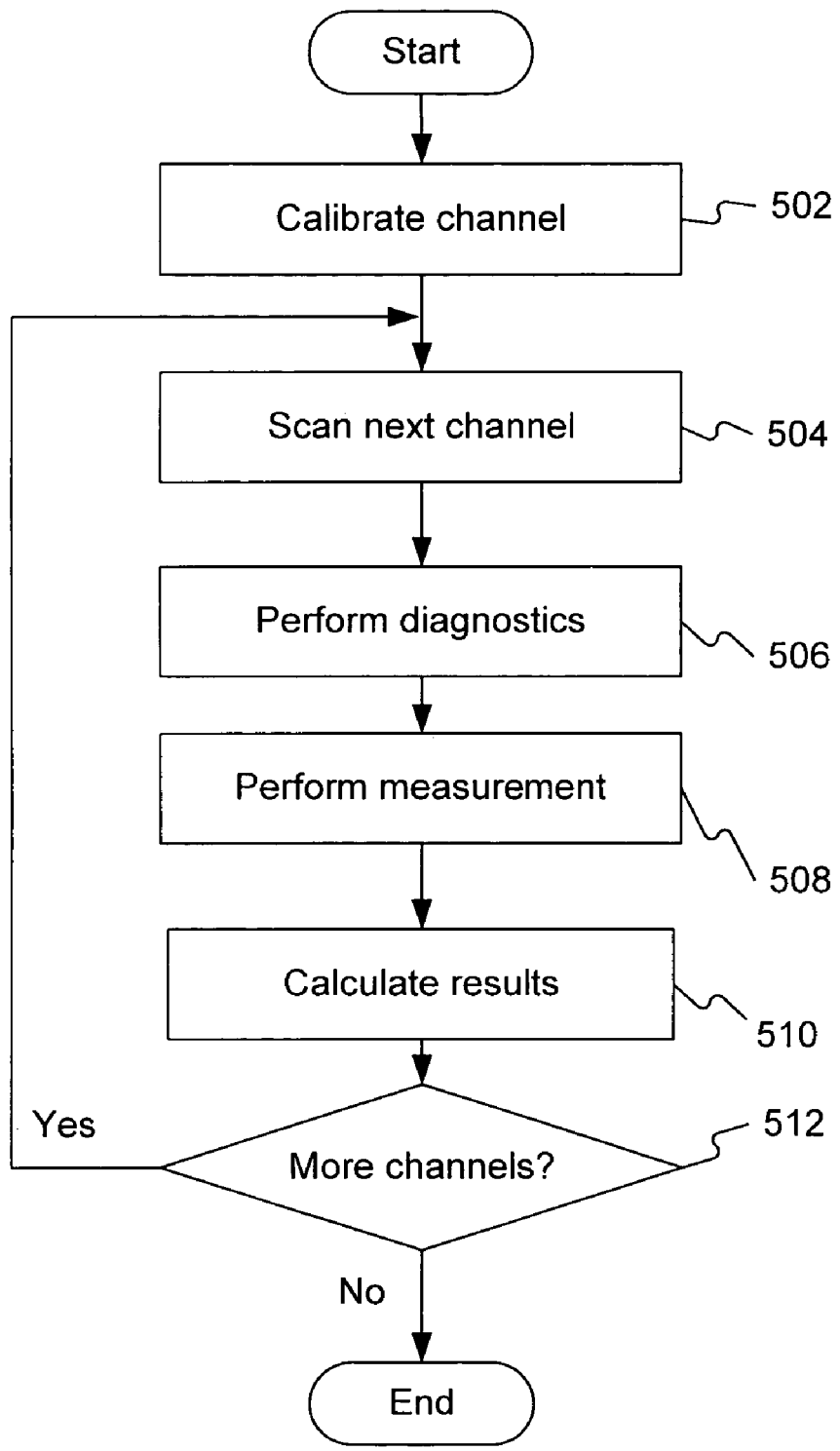
FIG. 5 illustrates a flowchart diagram of an exemplary operation process consistent with certain disclosed embodiments.

Returning to FIG. 2, in operation, controller 240, or processor 302 in particular, may execute software programs stored in memory module 306 to perform a variety of operations of temperature measurement system 110. FIG. 5 shows an exemplary operation process performed by controller 240.

As shown in FIG. 5, at the beginning of the operation process, controller 240 may calibrate available temperature sensor channels (step 502).

For example, controller 240 may obtain offset and span calibration values for each channel, and may also derive a calibration slope or calibration factor for each channel. Controller 240 may then store calibration slope values or calibration factors in memory module 306. More specifically, controller 240 may store such values in a flash memory and/or an EEPROM of memory module 306 to be used later in measurement process.

After calibrating the available channels (step 502), controller 240 may start measurement operation of a particular temperature sensor channel by scanning a next available channel (step 504). Controller 240 may first obtain configuration information on temperature sensor channels. The configuration information may be set by a user or may be automatically detected by controller 240. The configuration information may include whether a particular temperature sensor channel supports a 2-wire sensor or a 3-wire sensor. Controller 240 may perform different actions based on how many wires a particular temperature sensor has. For example, as explained above, a 3-wire temperature sensors may correspond to two temperature sensor channels.

Controller 240 may use address lines 215 (e.g., via I/O interface 304) and selector logic 212 (e.g., via control line 214) to scan the next available temperature sensor channel. For example, when selecting a 2-wire temperature sensor channel corresponding to input lines 204-1 and 204-2, controller 240 may set address lines 215 to '0000' and set control line 214 to '0'. As explained above, when control line 214 is set to '0', selector logic 212 may set selector lines 216 of high side multiplexer 208 at the same value as address lines 215. Because selector lines 217 of low side multiplexer 210 are configured of the same value as address lines 215, high side multiplexer 208 and low side multiplexer 210 may both select channel 1 as indicated in Table 1. Controller 240 may then obtain information corresponding to input line 204-1 and input line 204-2.

On the other hand, when selecting a 3-wire temperature sensor channel corresponding to input lines 204-1, 204-2, and 204-4, controller 240 may first set address lines 215 to '0000' and set control line 214 to '1'. When control line is set to '1', selector logic 212 may set selector lines 216 of high side multiplexer 208 as '0000' to select channel 1 (i.e., input line 204-1) as indicated in Table 2. In the meantime, selector lines 217 of low side multiplexer 210 are '0000', the same as address lines 215. Low side multiplexer 210 may then select input line 204-2 (i.e., channel 1) as indicated in Table 1.

After obtaining information corresponding to both input line 204-1 and input line 204-2, controller set address lines 215 to '0001' while keeping control line 214 as '1'. When control line is '1', selector logic 212 may set selector lines 216 of high side multiplexer 208 as '0000' to keep selecting channel 1 (i.e., input line 204-1) as indicated in Table 2. Selector lines 217 of low side multiplexer 210, however, are now '0001'. Low side multiplexer 210 may now select input line 204-4 (i.e., channel 2) as indicated in Table 1. Controller 240 may then obtain information corresponding to input line 204-1 and input line 204-4.

The information obtained corresponding to input lines 204-1 and 204-2, and input lines 204-1 and 204-4 may be used to obtain measurement data of the 3-wire temperature sensor in the above example. Although only channels 1 and 2, 2-wire sensors, and 3-wire sensors are illustrated, other channels and sensors with different number of wires may be used. Sensor with different number of wires may also be used together on different temperature sensor channels.

After, or concurrently with, obtaining the available channel by using address lines 215 (step 504), controller 240 may perform certain real time diagnostic functions (step 506). For example, controller 240 may use diagnostic circuit 244 to detect open sensors, sensors short to system voltage (e.g., 32 V), and/or sensors short to ground. Other diagnostics may also be performed. If controller 240 detect a faulty channel during diagnostics, controller 240 may skip the faulty channel. Alternatively controller 240 may report such faulty condition to a user or an external system.

Figure 6:
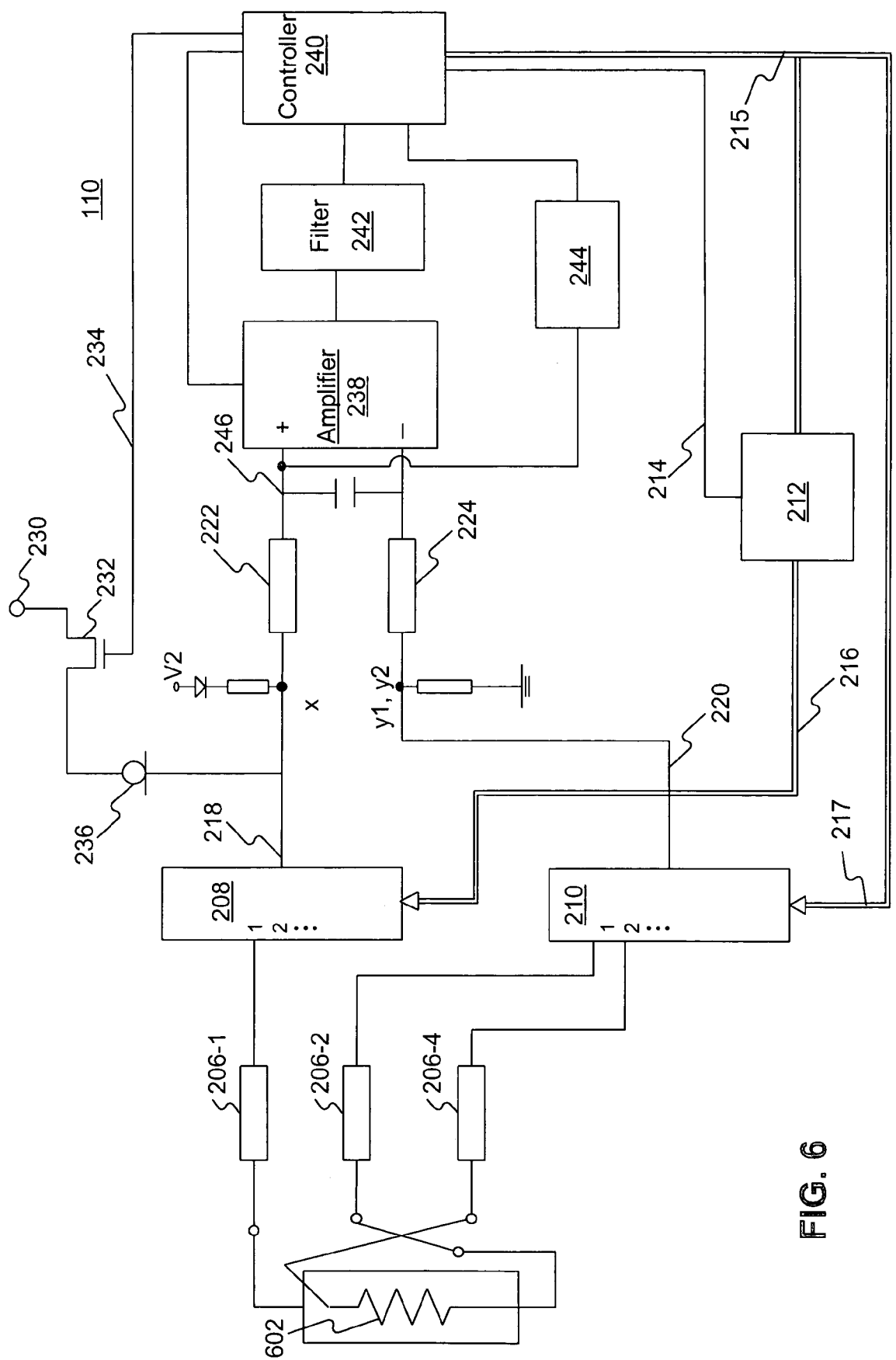
FIG. 6 illustrates a block diagram of an exemplary temperature measurement system in connection with a 3-wire temperature sensor.

With completion of the real time diagnostics (step 506), controller 240 may perform temperature measurement using the obtained information corresponding to input lines of the available channel (step 508). For example, controller 240 may perform temperature measurement on the 3-wire temperature sensor in the above example. FIG. 6 shows an exemplary temperature measurement system in connection with a 3-wire temperature sensor 602.

As shown in FIG. 6, 3-wire sensor 602 is coupled to input lines 204-1, 204-2, and 204-4. As explained above, controller 240 may scan the temperature sensor channel to obtain information corresponding to input lines 204-1 and 204-2. For example, controller 240 may measure a voltage difference between input line 204-1 and input line 204-2. The voltage difference may be measured as $$\Delta V_1 = V_x - V_{y1} = I_c \times (R_{MUX-H} + R_w + R_w + R_{RTD} + R_{MUX-L}),$$

where $R_w$ is the resistance value of any of resisters 206-1 to 206-4 (for simplicity purpose, all resisters 206-1 to 206-4 may have the same resistance value), $R_{RTD}$ is the resistance of temperature sensor 602 (e.g., an RTD temperature sensor), $R_{MUX-H}$ is the resistance of high side multiplexer, $R_{MUX-L}$ is the resistance of low side multiplexer, and $I_c$ is the current from current source 236.

Controller 240 may also measure a voltage difference between input line 204-1 and input line 204-4. The voltage difference may be measured as $$\Delta V_2 = V_x - V_{y2} = I_c \times (R_{MUX-H} + R_w + R_w + R_{MUX-L}).$$

After obtaining the voltage differences between input lines 204-1 and 204-2 and input lines 204-1 and 204-4, controller 240 may measure an actual sensor voltage $V_{RTD}$ of sensor 602 by subtracting $\Delta V_1$ from $\Delta V_2$. Thus the actual sensor voltage may be represented by:

$$V_{RTD} = \Delta V_1 - \Delta V_2 = I_c \times (R_{MUX-H} + R_w + R_w + R_{RTD} + R_{MUX-L}) - I_c \times (R_{MUX-H} + R_w + R_w + R_{MUX-L}) = I_c \times R_{RTD}$$

Figure 7:
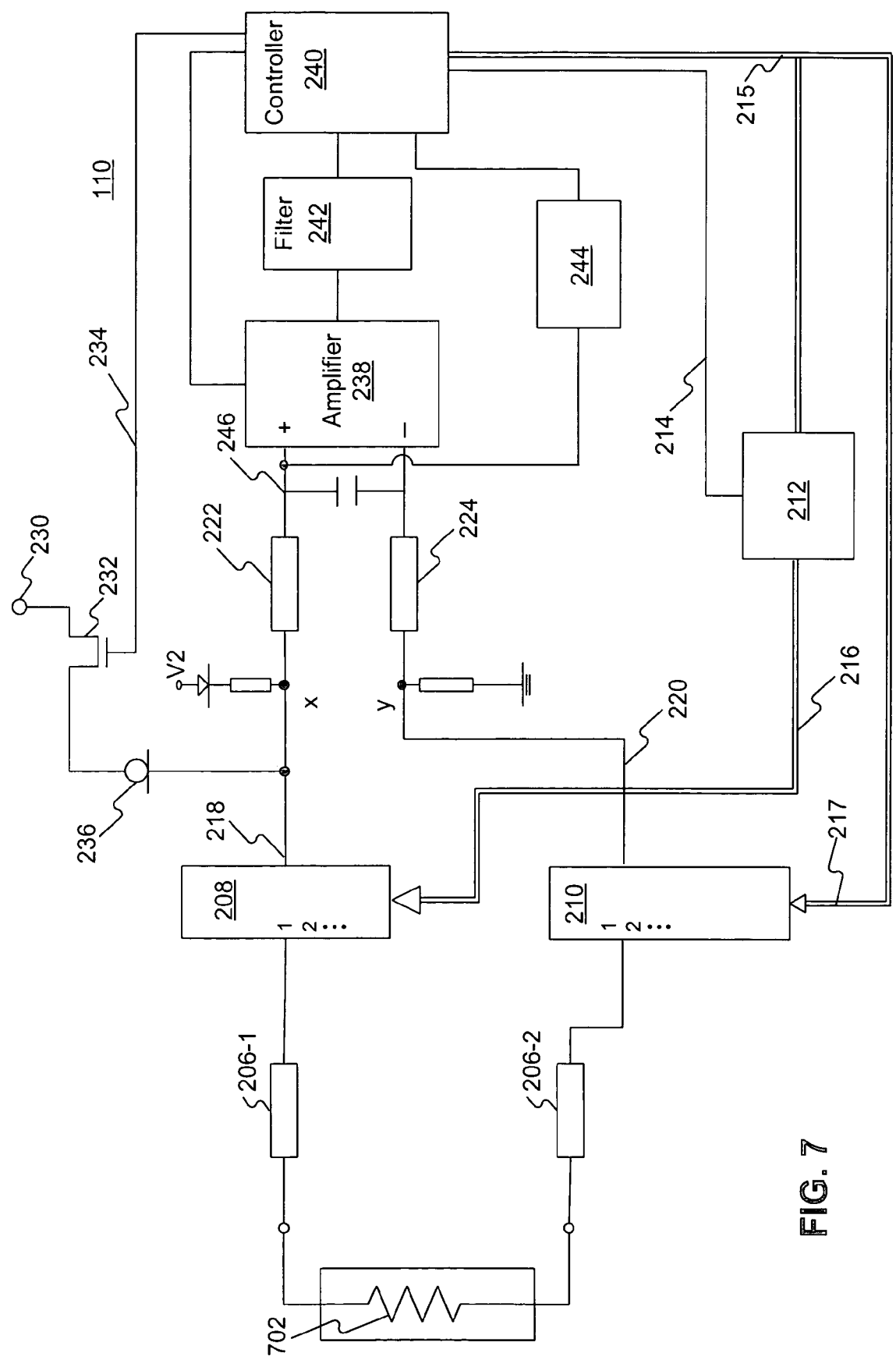
FIG. 7 illustrates a block diagram of an exemplary temperature measurement system in connection with a 2-wire temperature sensor.

Controller 240 may also perform temperature measurement on 2-wire temperature sensors. FIG. 7 shows an exemplary temperature measurement system in connection with a 2-wire temperature sensor 702. As shown in FIG. 7, 2-wire sensor 702 is coupled to input lines 204-1 and 204-2. As explained above, controller 240 may set address lines 215 to '0000' and set control line 214 to '0'. Both high side multiplexer and low side multiplexer may then select channel 1 as indicated in Table 1. Controller 240 may then measure an actual sensor voltage differentially across points x and y.

In certain embodiments, 2-wire temperature sensor 702 may be a type of temperature sensor that generates electric current, such as a thermocouple type of temperature sensor. When measuring temperature sensors actively generating current, controller 240 may disable current source 236. To disable current source 236, controller 240 may turn off electronic switch 232 to disconnect current source 236 by setting switch control signal 234 to '0'.

Figure 8:
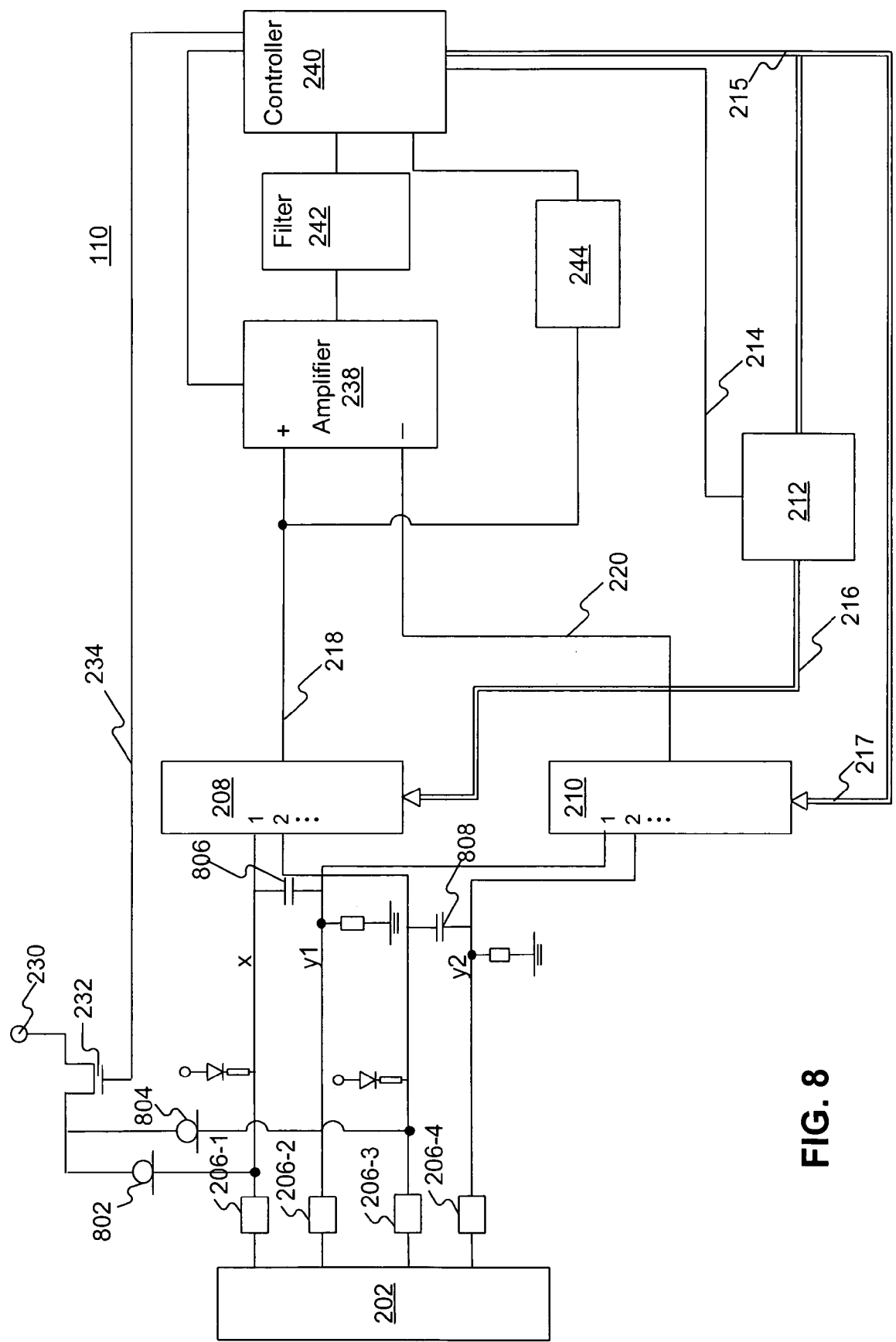
FIG. 8 illustrates a block diagram of an exemplary high frequency temperature measurement system consistent with certain disclosed embodiments.

In certain other embodiments, temperature measurement system 110 may be configured to provide fast channel scanning and measurement for high frequency temperature measurement. High frequency temperature measurement may require fast circuit setup time. FIG. 8 shows an exemplary temperature measurement system 110 with a high frequency configuration.

As shown in FIG. 8, individual channels (e.g., channels 1 and 2) may be provided with respective current sources (e.g., current sources 802 and 804). Individual channels 1 and 2 may also be provided with respective current return paths. Additionally, individual channels 1 and 2 may be provided with dedicated low pass filters 806 and 808 (associated resistors not shown) to minimize the setup and charge/discharge time.

Performing high frequency measurement of the 3-wired temperature sensor in the above examples, controller 240 may measure voltage difference between input lines 204-1 and 204-2 as $$\Delta V_1 = V_x - V_{y1} = I_c \times (R_w + R_w + R_{RTD})$$

Controller 240 may also measure a voltage difference between input line 204-1 and input line 204-4. The voltage difference may be measured as $$\Delta V_2 = V_x - V_{y2} = I_c \times (R_w + R_w).$$

Further, controller 240 may measure the actual sensor voltage $V_{RTD}$ of the 3-wired temperature sensor by subtracting $\Delta V_1$ from $\Delta V_2$. Thus the actual sensor voltage may be represented by:

$$V_{RTD} = \Delta V_1 - \Delta V_2 = I_c \times (R_w + R_w + R_{RTD}) - I_c \times (R_w + R_w) = I_c \times R_{RTD}$$

Returning to FIG. 5, after completing the measurement (step 508), controller 240 may calculate a temperature reading or a temperature range based on the voltage measurement (step 510). Controller 240 may use predetermined algorithms to calculate results based on the type of the temperature sensor under measurement. Controller 240 may also include other information in the calculation, such as calibration information, compensation information, and/or calculated constants of various circuit components. Further, controller 240 may also present the calculated results to operators or other modules of work machine 100.

Controller 240 may also determine whether there are other temperature channels to be measured (step 512). If there are more channels to be measured (step 512; yes), the operation process returns to step 506. On the other hand, if all available channels are measured (step 512; no), the operation process is completed. The operation process, however, may be started periodically by the controller 240 to continuously monitor or measure the temperature sensor channels.

INDUSTRIAL APPLICABILITY

The disclosed systems and methods may-provide desired solutions for accommodating various temperature sensors on the same input terminals of a connector without adding external elements and/or splitting input wires of the connector. This flexibility may be further enhanced by real time diagnostic capability to identify valid channels. The number of front-end circuit replacements or extra printed circuit (PC) boards for different temperature sensors may be substantially reduced or eliminated. Cost of design, production, and maintenance of the temperature measurement systems may be significantly reduced.

The disclosed methods and systems may provide improved accuracy for temperature measurement to use temperature sensors with less input wires. At the same time, conventional need for matched current sources may also be reduced or eliminated. Further, the disclosed methods and systems may be incorporated in any vehicles or machines where it would be desirable to measure and/or monitor temperatures at various locations and using various temperature sensors. The disclosed methods and systems may also be used in any type of application where different types of temperature sensors are to be used.

Those skilled in the art will recognize that the systems and methods described above are exemplary only and not intended to be limiting. The described systems and methods may be modified, and other systems, methods, or processes may be created without departing from the principle and scope of disclosed embodiments.

What is claimed is:

1. A temperature measurement system, comprising:
   a controller including a plurality of address lines;
   a sensor configured to provide a plurality of input lines;
   a connector configured to accept the input lines from the sensor;
   a first multiplexer coupled with at least one input line from the sensor via the connector and including a plurality of selector lines;
   a second multiplexer coupled with one or more other input line from the sensor via the connector and including a plurality of selector lines, wherein the selector lines of the second multiplexer are respectively coupled to the address lines of the controller; and
   a logic device coupled between the selector lines of the first multiplexer and the address lines of the controller such that the at least one input line coupled to the first multiplexer corresponds to the one or more of the other input lines coupled to the second multiplexer to provide temperature measurement.

2. The temperature measurement system according to claim 1, further including:
   a current source coupled to an output of the first multiplexer to provide current to the sensor; and
   a low pass filter coupled between the output of the first multiplexer and an output of the second multiplexer.

3. The temperature measurement system according to claim 1, further including:
   an amplifier, wherein a positive input of the amplifier is coupled to an output of the first multiplexer and a negative input of the amplifier is coupled to an output of the second multiplexer.

4. The temperature measurement system according to claim 3, wherein:
   the controller is coupled to an output of the amplifier to accept signals corresponding to sensor measurement from the amplifier; and
   the controller controls the logic device through a control line such that the logic device correlates the selector lines of the first multiplexer and the address lines of the controller based on the value of the control line.

5. A temperature measurement system, comprising:
   a connector configured to accept a plurality of temperature sensor channels, each having a first input and a second input;
   a first multiplexer having a plurality of input lines respectively coupled to the first inputs of the plurality of temperature sensor channels;
   a second multiplexer having a plurality of input lines respectively coupled to the second inputs of the plurality of temperature sensor channels;
   a controller having address lines coupled to selector lines of the first multiplexer and selector lines of the second multiplexer; and a logic device, coupled between the selector lines of the first multiplexer and the address lines, configured to correlate a first input selected by the first multiplexer with a variable number of second inputs selected by the second multiplexer such that the first input selected by the first multiplexer and the variable number of the second inputs selected by the second multiplexer are coupled to input lines of a temperature sensor.

6. The temperature measurement system according to claim 5, wherein the controller controls the logic device through a control line such that the logic device correlates the selector lines of the first multiplexer and the address lines of the controller based on the control line.

7. The temperature measurement system according to claim 5, wherein the controller further includes:
 a flash memory device configured to store calibration information of one or more temperature sensors connected to the connector;
 a processor configured to:
  select a first channel from the plurality of temperature sensor channels for both the first multiplexer and the second multiplexer;
  select a second channel from the plurality of temperature sensor channels for the second multiplexer; and
  obtain sensor information based on voltage information between the first input and the second input of the first channel and voltage information between the first input of the first channel and the second input of the second channel.

8. The temperature measurement system according to claim 5, wherein the logic device correlates the first input of a first temperature sensor channel with the second input of the first temperature sensor channel and the second input of a second temperature sensor channel.

9. The temperature measurement system according to claim 5, further including:
 an amplifier, wherein a positive input of the amplifier is coupled to an output of the first multiplexer and a negative input of the amplifier is coupled to an output of the second multiplexer.

10. The temperature measurement system according to claim 9, further including:
 a diagnostic circuit coupled between the positive input of the amplifier and the controller to provide connection information of one or more temperature sensors connected to the connector.

11. The temperature measurement system according to claim 5, further including:
 a current source coupled to an output of the first multiplexer to provide current to the plurality of temperature sensor channels.

12. The temperature measurement system according to claim 11, further including:
 a low pass filter coupled between the output of the first multiplexer and an output of the second multiplexer.

13. The temperature measurement system according to claim 5, further including:
 a plurality of current sources respectively coupled to the first inputs of the plurality of temperature sensor channels.

14. The temperature measurement system according to claim 13, further including:
 a plurality of low pass filters respectively coupled between the respective first inputs and second inputs of the plurality of temperature sensor channels.

15. A machine, comprising:
 an engine configured to provide power to the machine;
 a sensor configured to measure temperature related to the machine; and
 a temperature measurement system configured to accept the sensor for temperature measurement, wherein the temperature measurement system includes:
  a controller;
  a connector configured to accept input lines from the sensor;
  a first multiplexer coupled with an input line from the sensor;
  a second multiplexer coupled with one or more other input line from the sensor, wherein selector lines of the second multiplexer are respectively coupled to address lines of the controller; and
  a logic device coupled between selector lines of the first multiplexer and the address lines of the controller such that the input line coupled to the first multiplexer corresponds to the one or more other input line coupled to the second multiplexer to provide the temperature measurement.

16. The machine according to claim 15, wherein the controller further includes:
 a flash memory device configured to store calibrating information of the sensor.

* * * * *